US006670419B2

(12) United States Patent
Lau et al.

(10) Patent No.: US 6,670,419 B2
(45) Date of Patent: Dec. 30, 2003

(54) METHOD OF TOUGHENING THERMOPLASTIC POLYMERS AND THERMOPLASTIC COMPOSITIONS PRODUCED THEREBY

(75) Inventors: Willie Lau, Ambler, PA (US); Paul Ralph Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/951,692

(22) Filed: Sep. 13, 2001

(65) Prior Publication Data

US 2002/0058752 A1 May 16, 2002

Related U.S. Application Data

(60) Provisional application No. 60/232,414, filed on Sep. 14, 2000.

(51) Int. Cl.$^7$ .......................... C08L 65/00; C08L 67/00; C08L 69/00
(52) U.S. Cl. .............................. 525/64; 525/66; 525/67; 525/68; 525/69; 525/76; 525/80; 525/87
(58) Field of Search .............................. 525/76, 80, 87, 525/64, 66, 67, 68, 69

(56) References Cited

U.S. PATENT DOCUMENTS

| | | | |
|---|---|---|---|
| 3,862,102 A | 1/1975 | Milkovich et al. | |
| 3,879,494 A | 4/1975 | Milkovich et al. | |
| 5,028,677 A | 7/1991 | Janowicz ..................... 526/329 |
| 5,053,461 A | 10/1991 | Tone et al. | |
| 5,116,910 A | 5/1992 | Tone et al. | |
| 5,120,790 A | 6/1992 | Yu ............................. 525/186 |
| 5,164,454 A | 11/1992 | Suga et al. | |
| 5,225,491 A | * 7/1993 | Yu | |
| 5,247,040 A | 9/1993 | Amick et al. ................ 526/286 |
| 5,264,530 A | 11/1993 | Darmon et al. .............. 526/194 |
| 5,521,266 A | 5/1996 | Lau ............................. 526/200 |
| 5,602,220 A | 2/1997 | Haddleton et al. ........... 526/172 |
| 5,756,605 A | 5/1998 | Moad et al. ................... 526/93 |
| 5,804,632 A | 9/1998 | Haddleton et al. ........... 524/458 |
| 6,017,992 A | 1/2000 | Haddleton et al. ........... 524/458 |
| 6,107,392 A | 8/2000 | Antonelli et al. ............ 524/504 |

FOREIGN PATENT DOCUMENTS

| | | |
|---|---|---|
| EP | 0212542 A | 3/1987 |
| WO | WO99/03905 | 1/1999 |

OTHER PUBLICATIONS

Applications of Anionic Polymerization Research, R. P. Quirk Ed, ACS Symp. Ser. 696, 208(1998); "Practical Applications of Macromonomer Techniques for the Synthesis of Comb–Shaped Copolymers", Authors S. Roos, A.H. E. Muller, M. Kaufmann, W. Siol, C. Auschra.

Journal of Polymer Science Part A: Polymer Chemistry, vol. 34, 3173 3181; "Compatibilization of the PBA/PMMA Core/Shell Latex Interphase, I. Partitioning of PMMA Macromonomer in the PBA Seed Latex", Authors, V. Nelliappan, M. S. El–aasser, A. Klein, E. S. Daniels, and J. E. Roberts.

J. Macromol Sci.—Chem. A27(4) pp. 491–507 (1990), "Copolymerization of Polymethyl Methacrylate Macromers with n–Butyl Acrylate and Mechanical Properties Of the Graft Copolymers", Authors Hong–Quan Xie and Shi–Biao Zhou.

* cited by examiner

*Primary Examiner*—Jeffrey Mullis
(74) *Attorney, Agent, or Firm*—Richard R. Clikeman

(57) ABSTRACT

A method of forming a toughened article from a blend of a thermoplastic polymer and a comb copolymer is disclosed, along with the toughened article produced thereby. Compositions such as solids blends and melt blends, including a thermoplastic polymer and a comb copolymer, are also disclosed.

14 Claims, No Drawings

METHOD OF TOUGHENING THERMOPLASTIC POLYMERS AND THERMOPLASTIC COMPOSITIONS PRODUCED THEREBY

This application is a continuation-in-part of Ser. No. 60/232,414, filed Sep. 14, 2000.

The present invention relates to a method of toughening thermoplastic polymers through incorporation of comb copolymers. The present invention further relates to compositions and articles produced thereby.

It is well known in the art that thermoplastic polymers are often brittle, in and of themselves, when melt processed into articles. These thermoplastic polymers may, however, be toughened through incorporation of toughening agents commonly known in the art as impact modifiers. An impact modifier may, typically, be combined with a thermoplastic polymer as a solids blend, or dry blend. The solids blend may then by subjected to melt processing (i.e., mixing at elevated temperature) and shaping to form an article. Through this process of dry blending, followed by melt processing, the impact modifier particles may become dispersed throughout the melt blend and, hence, throughout the article that is ultimately formed.

Typically, an impact modifier is a particulate polymer having one or more phases, wherein at least one of those polymeric phases is characterized by a glass transition temperature, Tg, below the envisioned use temperature of the article into which it is to be incorporated. Although not wishing to be bound by theory, it is thought that the dispersed low Tg impact modifier phases serve to distribute and dissipate the energy associated with a narrowly focused impact event.

Core-shell impact modifiers are used commercially to toughen poly(vinyl chloride) and other thermoplastic polymers. These core-shell polymers exist as particles having a diameter (i.e., particle size) of characteristically from 0.1 to one micron. The core is made of a low Tg polymer (e.g., less than 0° C.) which is crosslinked. The core polymer is further not miscible with the thermoplastic polymer due to its composition and its state of crosslinking. As a result, it is necessary to provide the core with a shell made of a polymer that is miscible with the thermoplastic polymer. During melt processing, the miscible shell polymer, which may be grafted to the core polymer to some extent, interacts with the thermoplastic polymer to speed the break up of the larger powder particles (typically a few hundred microns in diameter) into much smaller core-shell particles (0.1–1 micron), and to enhance dispersion of the individual core-shell particles into the thermoplastic melt. In this way, thermoplastic articles are made that contain uniformly distributed core-shell particles, and hence rubbery core domains, throughout. While these core-shell polymers perform as impact modifiers for many thermoplastics, they are limited in that their crosslinked cores have only a single size and not all of the compatibilizing chains of shell polymer are attached to the core network. Thus, the shell polymer never fully realizes its potential to compatibilize the core polymer (Plastic Additives and Modifiers Handbook, Ed. J. Edenbaum, pp 559–589, Chapman and Hall NY, 1996).

U.S. Pat. No. 5,120,790 discloses comb copolymers bearing polylactone side chains. These polylactone comb copolymers, having number average molecular weights of at least 10,000, are disclosed as forming compatible blends with thermoplastic resins. The extent of compatibility of these comb copolymers, the backbones of which are not miscible in the thermoplastic resins, is limited by the extent to which the polylactone side-chains are miscible in any given thermoplastic resin. Unfortunately, the solubility characteristics of thermoplastic resins vary greatly, yet the solubility characteristics of the side chains of the U.S. Pat. No. 5,120,790 disclosure are confined to the narrow range of values possible for polylactones. As such, there will be many thermoplastic resins in which the polylactone side chains will not be soluble, and therefore will not be effective to compatibilize the comb copolymer backbone. Without such compatibilization, the comb copolymer is unable to bring about improvement in features of the thermoplastic polymer, such as toughening, or the ability to form compatible blends with other thermoplastic polymers. Moreover, it is well known in the art that polyesters like the polylactones of U.S. Pat. No. 5,120,790 are easily hydrolyzed by water at elevated temperature or by basic pH conditions (Encyclopedia of Polymer Science and Engineering, Ed. H. F. Mark, volume 12, p. 5, John Wiley and Sons, NY (1988)). Further, when processing at melt temperatures, polyester-containing materials (here, polylactone-containing) must be carefully dried to avoid polymer decomposition, and under use conditions (weathering, exposure, etc.) contact with alkaline substrates and exposure to pH conditions deviating significantly from neutral must be avoided.

We have, surprisingly, found that comb copolymers bearing graft segments other than polylactone may be blended with thermoplastic polymers and the melt blend processed into articles that are toughened when compared with similar articles prepared from the thermoplastic polymer absent the comb copolymer. The comb copolymers of the present invention are particularly resistant to degradation under conditions of prolonged weathering. Because the compositions of the graft segments of the present invention may be varied over a wide range, compatibilization of the comb copolymer of the present invention with a wide variety of thermoplastic resins is possible. The comb copolymers of the present invention, preferably, produced by an aqueous emulsion process that results in the preparation of a plurality of comb copolymer particles having uniform size well defined molecular weight. The synthetic method further makes possible preparation of compositionally diverse backbones and graft segments, so that a comb copolymer well suited to toughen a particular thermoplastic polymer may be readily prepared. The comb copolymers typically can be isolated and stored as powders without compacting, clumping, or fusing. Heating and mixing of these solids blends produces melt blends, having improved melt processing behavior, that can be shaped and cooled to produce homogeneous, useful thermoplastic articles. The improved melt processing behavior imparted by the comb copolymer assures production of homogeneous articles having uniform distribution of domains of immiscible rubbery polymer throughout. Articles toughened in this way are thus produced at high output rates with minimal downtime in such processing operations as, for example, calendering, extrusion, blow molding, injection molding, expansion into foam, and making of bi-oriented materials.

One aspect of the present invention relates to a method comprising the steps of:
 (a) forming a solids blend comprising a thermoplastic polymer and a comb copolymer;
 (b) heating and mixing said solids blend to form a melt blend;
 (c) shaping said melt blend to form an article; and
 (d) cooling said article to room temperature;
 wherein said comb copolymer comprises a backbone and at least one graft segment;

wherein said graft segment does not contain, as polymerized units, lactone monomer; and wherein said comb copolymer is present in an amount sufficient that said article has an impact resistance energy increased at least 15 percent compared to a second article formed identically, absent said comb copolymer.

A second aspect of the present invention relates to a toughened article:

wherein said article comprises a thermoplastic polymer and a comb copolymer;

wherein said comb copolymer comprises a backbone and at least one graft segment;

wherein said graft segment of said comb copolymer does not contain, as polymerized units, lactones; and wherein said comb copolymer is present in an amount sufficient that said article has an impact resistance energy increased at least 15 percent compared to a second article formed identically, absent said comb copolymer.

A third aspect of the present invention relates to an article produced by the method of the first aspect of the present invention.

In yet another aspect of the present invention, the thermoplastic polymer is a polymer selected from the group consisting of poly(vinyl halide), ABS terpolymer, poly(styrene-acrylonitrile), poly(styrene-acrylonitrile-acrylate), polyaromatics, poly(vinyl acetate), poly(vinyl methyl ether), chlorinated polyethylene, phenoxy (polyhydroxypropylether of bisphenol A), poly(methyl methacrylate), poly(styrene-maleic anhydride), poly(ethylene-vinyl acetate), polyesters, polyamides, polyacetal, polyurethane, polyolefins, polycarbonate, and combinations thereof.

Used herein, the following terms have these definitions:

The "backbone" of a polymer chain is a collection of polymerized monomer units attached to one another. The attachment is typically achieved by covalent bonding. "Non-terminal" monomer units are directly attached to at least two other monomer units. A "terminal" monomer unit resides at the end of the polymer chain and is directly attached to one other monomer unit. For example, the polymerized monomer units of the backbone may be derived from ethylenically unsaturated monomers. It is required that the composition of the backbone of the comb copolymer of the present invention will be such that the backbone is not miscible in the thermoplastic polymer of the invention. The solubility parameters of the backbone and the thermoplastic polymer can be estimated and compared to predict miscibility by methods such as that of Van Krevelen, described herein below.

A "linear" polymer (homopolymer or copolymer) is a polymer having a backbone that is not branched. As used herein, the term "linear" is also meant to include polymers wherein a minor amount of branching has occurred. For example, hydrogen abstraction may lead to branching during free radical polymerizations.

A "branched" polymer is a polymer having a first "backbone segment" that has other backbone segments (i.e., "branches") chemically attached to it through a "non-terminal" atom of the first backbone segment. Typically, this first backbone segment and all of the branches have the same, or similar, composition.

A "pendant" group is a group that is attached to the backbone of a polymer. The term pendant may be used to describe a group that is actually part of a polymerized monomer unit. For example, the hydroxyethyl group of a polymerized unit of 2-hydroxyethyl methacrylate may be referred to as a "pendant hydroxyethyl group", or as "pendant hydroxy functionality". It is also common to refer to large groups attached to a polymer backbone as "pendant" when those large groups are compositionally distinct from the backbone polymer. These large groups may themselves be polymer chains. For example, when a macromonomer becomes incorporated into a polymer chain by reaction with other monomers, the two carbons of its reactive double bond become part of the backbone, while the polymeric chain originally attached to the double bond of the macromonomer becomes a "pendant group" that may, for example, have a molecular weight of 500 to 100,000. A "pendant" group may further be described as "pendant to" the backbone.

A "terminal" group resides at the end of the polymer chain and is chemically attached to a terminal monomer unit. A terminal group may, for example, have a composition distinct from the composition of the backbone of the polymer. A "pendant" group may occur in a "terminal" position. As such, a "terminal" group is a special case of a "pendant" group.

A "macromonomer" is any low molecular weight water-insoluble polymer or copolymer having at least one terminal ethylenically unsaturated group that is capable of being polymerized in a free radical polymerization process. By "water-insoluble" it is meant having a water solubility of no greater than 150 millimoles/liter at 25° C. to 50° C. By "low molecular weight" it is meant that the macromonomer has a degree of polymerization preferably from 10 to 1,000, more preferably from 20 to 1,000, and most preferably from 20 to about 200. By "degree of polymerization" it is meant the number of polymerized monomer units present in the macromonomer. See e.g., Kawakami in the "Encyclopedia of Polymer Science and Engineering", Vol. 9, pp. 195–204, John Wiley & Sons, New York, 1987. Typically, the macromonomer polymer chain contains ethylenically unsaturated monomers, as polymerized units. Preferably, the ethylenically unsaturated monomer is selected to impart low or no water solubility to the macromonomer as previously described herein.

The term "macromonomer aqueous emulsion" is used herein to describe an aqueous emulsion containing macromonomer dispersed therein as water insoluble particles.

A "graft segment" is a polymer chain occupying a pendant position along the polymer backbone. A graft segment may include, as polymerized units, one type of monomer or more than one type of monomer. The composition of a graft segment is different from the composition of the backbone polymer to which it is attached, in contrast to a "branch segment" of a branched backbone which has a composition which is the same as, or similar to, other portions the branched backbone of which it is a part. A "terminal graft segment" resides at an end of a backbone polymer chain and is chemically attached to that backbone polymer chain. A "terminal graft segment" is a special case of a "pendant graft segment". It is understood that, when it is indicated that a "graft segment" is present in a comb copolymer, more than one type of graft segment may be present.

"Graft copolymers" are macromolecules formed when polymer or copolymer chains are chemically attached as side chains to a polymeric backbone. Those side chains are the "graft segments" described herein above. Because graft copolymers often chemically combine unlike polymeric segments in one macromolecule, these copolymers have unique properties compared to the corresponding random copolymer analogues. These properties include, for example, mechanical film properties resulting from thermodynamically driven microphase separation of the copolymer, and decreased melt viscosities resulting in part from the segmental structure of the graft copolymer, and from separation of a soft (i.e., low Tg) phase. With respect to the latter, reduced melt viscosities can advantageously improve processability of the polymer. See e.g., Hong-Quan Xie and Shi-Biao Zhou, J. Macromol. Sci.-Chem., A27(4), 491–507 (1990); Sebastian Roos, Axel H. E. Müller, Marita Kaufmann, Werner Siol and Clenens Auschra, "Applications of Anionic Polymerization Research", R. P. Quirk, Ed., ACS Symp. Ser. 696, 208 (1998).

The term "comb copolymer," as used herein, describes a type of graft copolymer, wherein the polymeric backbone of the graft copolymer is linear, or essentially linear, and each side chain (graft segment) of the graft copolymer is formed by a "macromonomer" that is grafted to the polymer backbone. The comb copolymers may, for example, be prepared by the free radical copolymerization of macromonomer with conventional monomer (e.g., second ethylenically unsaturated monomer). Used herein, the terms "comb copolymer" and "graft copolymer" have the same meaning. It is understood that when it is indicated that a "comb copolymer" is present in, for example, a solids blend, melt blend, or thermoplastic article, more than one type of comb copolymer may be present.

A "comb copolymer segment" is a segment selected from the group consisting of the "backbone" of a comb copolymer and the "graft segment" of a comb copolymer. It is preferred that graft segment of the present invention is miscible with the thermoplastic polymer of the present invention. It is further preferred that the backbone of the comb copolymer of the present invention not be miscible in the thermoplastic polymer. The solubility parameters of a given copolymer segment and the thermoplastic polymer can be estimated and compared to predict miscibility by methods such as that of Van Krevelen described herein below.

A "aqueous dispersion of a segmental copolymer" is a aqueous medium in which are dispersed a plurality of particles of segmental copolymer. Used herein, an "aqueous dispersion of a segmental copolymer" is an "aqueous copolymer composition".

"Tg" is the "glass transition temperature" of a polymeric phase. The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20 Centigrade degrees per minute. The Tg of various homopolymers may be found, for example, in *Polymer Handbook*, edited by J. Brandrup and E. H. Immergut, Interscience Publishers. The Tg of a polymer is estimated by using the Fox equation (T. G. Fox, Bull. *Am. Physics Soc.*, Volume 1, Issue No. 3, page 123 (1956)).

"Effective Tg". When a substance having some degree of solubility in a polymer is imbibed by that polymer, the softening temperature of the polymer decreases. This plasticization of the polymer can be characterized by measuring the "effective Tg" of the polymer, which typically bears an inverse relationship to the amount of solvent or other substance contained in the polymer. The "effective Tg" of a polymer containing a known amount of a substance dissolved within is measured just as described above for "Tg". Alternatively, the "effective Tg" may be estimated by using the Fox equation (supra), assuming a value for Tg (e.g., the freezing point) of the solvent or other substance contained in the polymer.

Molecular Weight. Synthetic polymers are almost always a mixture of chains varying in molecular weight, i.e., there is a "molecular weight distribution", abbreviated "MWD". For a homopolymer, members of the distribution differ in the number of monomer units which they contain. This way of describing a distribution of polymer chains also extends to copolymers. Given that there is a distribution of molecular weights, the most complete characterization of the molecular weight of a given sample is the determination of the entire molecular weight distribution. This characterization is obtained by separating the members of the distribution and then quantitating the amount of each that is present. Once this distribution is in hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(W_i/M_i) = \Sigma(N_i M_i)/\Sigma N_i$$

where:

$M_i$ = molar mass of $i^{th}$ component of distribution $W_i$ = weight of $i^{th}$ component of distribution $N_i$ = number of chains of $i^{th}$ component and the summations are over all the components in the distribution. $M_w$ and $M_n$ are typically computed from the MWD as measured by Gel Permeation Chromatography (see the Experimental Section).

"Particle size" is the diameter of a particle.

The "average particle size" determined for a collection of particles (e.g., macromonomer particles, or particles of graft copolymer) the "weight average particle size", "$d_w$", as measured by Capillary Hydrodynamic Fractionation technique using a Matec CHDF 2000 particle size analyzer equipped with a HPLC type Ultra-violet detector.

The term "particle size distribution" and the acronym "PSD" are used interchangeably. "Polydispersity" is used in the art as a measure of the breadth of the PSD. Used herein, "polydispersity" is a description of the distribution of particle sizes for a plurality of particles. As such, "polydispersity" and "PSD polydispersity" are used interchangeably. PSD polydispersity is calculated from the weight average particle size, $d_w$, and the number average particle size, $d_n$, according to the formulae:

$$PSD \text{ Polydispersity} = (d_w)/(d_n),$$

where $d_n = \Sigma n_i d_i / \Sigma n_i$ $d_w = \Sigma n_i d_i d_i / \Sigma n_i d_i$, and where $n_i$ is the number of particles having the particle size $d_i$.

Estimation of whether a polymer and another component (i.e., another polymer of a solvent) will be miscible may be made according to the well-known methods delineated in D. W. Van Krevelen, *Properties of Polymers*, $3^{rd}$ Edition, Elsevier, pp. 189–225, 1990. For example, Van Krevelen defines the total solubility parameter ($\delta_t$) for a substance by:

$$\delta_t^2 = \delta_d^2 + \delta_p^2 + \delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents, polymers, and polymer segments, and can be estimated using the group contribution methods of Van Krevelen. For example, to estimate whether a polymer having a given composition will be miscible with a particular solvent, one calculates $\delta_t^2$ for the polymer and $\delta_t^2$ for the solvent. Typically, if the difference between the two, $\Delta\delta_t^2$, is greater than 25 (i.e., $\Delta\delta_t^2>5$), then the polymer and the solvent will not be miscible.

If, instead, it is desired to determine whether two polymers, differing in composition, will be miscible, the same calculations may be carried out, but the predicted upper limit of $\Delta\delta_t^2$ for miscibility will decrease as the molecular weight of one or both of polymers under consideration increases. This decrease is thought to parallel the decrease in entropy of mixing which occurs as the molecular weight of the components being mixed increases. For example, two polymers, each having a degree of polymerization of 100, will likely be immiscible even if the value of $\Delta\delta_t^2$ for their mixture is 9, or even 4 (i.e., $\Delta\delta_t=3$, or even 2). Still higher molecular weight polymers may be immiscible at even lower values of $\Delta\delta_t$. To estimate whether a graft segment of the copolymer of the present invention, having a given composition, will be miscible with a backbone having another composition, one calculates $\delta_t^2$ for the graft segment and $\delta_t^2$ for the backbone. Typically, if the difference between the two, $\Delta\delta_t^2$, is greater than 9 (i.e., $\Delta\delta_t^2>3$), then the graft segment should be insoluble in the backbone polymer such that a film formed by the graft copolymer would have two distinct types of polymeric phase. Similar calculation can be performed to determine whether a graft segment of a particular composition will be miscible with a thermoplastic polymer of a given composition. Similar calculation can also be performed to determine whether a backbone of a particular composition will be immiscible with a thermoplastic polymer of a given composition. Because it is desirable that the graft segment be miscible with the thermoplastic polymer and that the backbone be immiscible with the same thermoplastic polymer, the Van Krevelen calculations of miscibility, and other similar calculation methods, provide useful estimates of whether a given pair of compositions of the graft segment and backbone will result in compatibilization of immiscible, rubbery backbone segments with the thermoplastic polymer to give the desired uniform distribution of those rubbery domains throughout the thermoplastic article.

A "solids blend" is any thermoplastic polymer composition that is substantially solid, and not a melt blend. Such solids blends include, for example, blends of thermoplastic polymer in powder or pellet form with other components that themselves may, or may not, be solids. Through heating and mixing, a solids blend may be transformed into a melt blend.

A "melt blend" is any thermoplastic polymer composition that is substantially in melt form. Fusion of a solids blend, through heating and mixing, creates a melt blend.

Used herein, a thermoplastic article is considered to be "toughened" at a given level of comb copolymer if the "impact resistance energy" (for either a clean break or a hinged break, depending on the outcome of the impact event) for Charpy specimens having compositions identical to that of the article is at least 15% greater than the "impact resistance energy" of specimens (i.e., standard Charpy specimens) identical in every way except that the comb copolymer is absent. The "impact resistance energy" for a set of identical Charpy specimens is herein defined as the sum of the average energy of the Charpy impact event at 15° C. and the average energy at 23° C., divided by 2. The following example shows how the impact resistance energies of Charpy specimens, with and without comb copolymer, can be compared. If standard Charpy specimens, prepared from a thermoplastic polymer blend containing 5 parts comb copolymer per 100 parts of thermoplastic polymer, have Charpy impact energies of 10 kJ/m$^2$ and 20 kJ/m$^2$ at 15° C. and 23° C., respectively, and identical specimens, prepared from the thermoplastic polymer absent the comb copolymer, have Charpy impact energies of 8 kJ/m$^2$ and 16 kJ/m$^2$ at 15° C. and 23° C., respectively, the percent increase in impact resistance energy afforded by incorporation of 5 PHR of comb copolymer is calculated to be $[((10/8+20/16)/2)-1]\times100\%=25\%$. Typically, determination of the impact energy (for clean or hinged breaks) at a given temperature is made using ten (10) Charpy specimens, and the average is calculated for that temperature. Put another way, in the above example the impact resistance energy for the specimens containing the comb copolymer at 5 parts is 15 kJ/m$^2$ (i.e., the average of 10 and 20), while that for the specimens absent the comb copolymer is 12 kJ/m$^2$ (i.e., the average of 8 and 16), and 15 is 25% greater than 12.

Used herein, an article of the present invention having a composition identical to the composition of Charpy specimens, prepared and tested using British Institute method 7413.1991, will be referred to as having a value for impact resistance energy equal to the value for impact resistance energy determined for those Charpy specimens. This definition applies to both: a toughened article that includes both a thermoplastic polymer and a comb copolymer; and a second article, identical in every way except that the comb copolymer is absent.

A preferred method of preparing the graft copolymers of the present invention and their aqueous dispersions is by emulsion polymerization. A preferred process for this preparation includes (a) forming, by polymerization of at least one first ethylenically unsaturated monomer, a macromonomer aqueous emulsion containing one or more water-insoluble particles of macromonomer; (b) forming a monomer composition containing at least one second ethylenically unsaturated monomer; and (c) combining at least a portion of the macromonomer aqueous emulsion and at least a portion of the monomer composition to form a "polymerization reaction mixture". The macromonomer and second ethylenically unsaturated monomer are polymerized in the presence of an initiator to form graft copolymer particles. The graft copolymers prepared by this preferred process are comb copolymers.

The macromonomer, present in the macromonomer aqueous emulsion as water insoluble particles, is any low molecular weight water-insoluble polymer or copolymer having at least one terminal ethylenically unsaturated group that is capable of being polymerized in a free radical polymerization process. By "water-insoluble" it is meant having a water solubility of no greater than 150 millimoles/liter at 25° C. to 50° C. By "low molecular weight" it is meant that the macromonomer has a degree of polymerization of preferably from 10 to 1,000, more preferably from 20 to 1,000, and most preferably from 20 to 200. By "degree of polymerization" it is meant the number of polymerized monomer units present in the macromonomer.

The macromonomer contains, as polymerized units, at least one first ethylenically unsaturated monomer. Preferably, the first ethylenically unsaturated monomer is selected to impart low or no water solubility to the macromonomer as previously described herein.

It is required that the composition of the macromonomer be chosen such that the graft segments of the comb copolymer formed therefrom will be miscible in the thermoplastic polymer of the invention. The solubility parameters of the macromonomer (and graft segment prepared therefrom) and the thermoplastic polymer can be estimated and compared to predict miscibility by methods such as that of Van Krevelen, described herein above.

The composition of the macromonomer should be chosen so that the Tg of the graft segment of the comb copolymer formed therefrom will be preferably from 50° C. to 180° C., more preferably from 50° C. to 130° C., and most preferably from 70° C. to 110° C.

Suitable first ethylenically unsaturated monomers for use in preparing macromonomer include for example methacrylate esters, such as $C_1$ to $C_{18}$ normal, branched, or cyclic alkyl esters of methacrylic acid, including methyl methacrylate, ethyl methacrylate, n-butyl methacrylate, cyclohexyl methacrylate, lauryl methacrylate, stearyl methacrylate; acrylate esters, such as $C_1$ to $C_{18}$ normal, branched, or cyclic alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; basic substituted (meth)acrylates and (meth)acrylamides, such as amine-substituted methacrylates including dimethylaminoethyl methacrylate, tertiary-butylaminoethyl methacrylate and dimethylaminopropyl methacrylamide and the likes; dienes such as 1,3-butadiene and isoprene; vinyl ethers; or combinations thereof. The term "(meth)" as used herein means that the "meth" is optionally present. For example, "(meth)acrylate" means methacrylate or acrylate.

The first ethylenically unsaturated monomer can also be a functional monomer including for example monomers containing hydroxy, amido, aldehyde, ureido, polyether, glycidylalkyl, keto functional groups or combinations thereof. These functional monomers are generally present in the macromonomer at a level of from 0.1 weight percent to 15 weight percent and more preferably from 0.5 weight percent to 10 weight percent, and most preferably from 1.0 to 3 weight percent, based on the total weight of the graft copolymer. Used herein, all ranges are inclusive and combinable. Examples of functional monomers include keto-functional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomers can provide crosslinking if desired.

The macromonomer typically also contains as polymerized units less than 10 weight percent, preferably less than 5 weight percent, more preferably less than 2 weight percent and most preferably less than 1 weight percent acid containing monomer, based on the total weight of the macromonomer. In a most preferred embodiment, the macromonomer contains no acid containing monomer. Used herein, "acid containing monomer" and "acid functional monomer" are used interchangeably. By "acid containing monomer" it is meant any ethylenically unsaturated monomer that contains one or more acid functional groups or functional groups that are capable of forming an acid (e.g., an anhydride such as methacrylic anhydride or tertiary butyl methacrylate). Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof.

The macromonomer may also contains as polymerized units, mercapto-olefins. Used herein, "mercapto-olefin" and "mercaptan-olefin" are used interchangeably. These mercapto-olefin compounds are those as disclosed in U.S. Pat. No. 5,247,000 to Amick. Further, the methods of U.S. Pat. No. 5,247,000 may be utilized to prepare comb copolymers of the present invention.

In a preferred embodiment of the present invention, the macromonomer is composed of 20 weight percent to 100 weight percent, more preferably from 50 to 100 weight percent, and most preferably from 70 to 100 weight percent, based on total weight of macromonomer, of at least one α-methyl vinyl monomer, a non α-methyl vinyl monomer terminated with an α-methyl vinyl monomer, or combinations thereof In a most preferred embodiment of the present invention the macromonomer contains as polymerized units from 90 to 100 weight percent α-methyl vinyl monomers, non α-methyl vinyl monomers terminated with α-methyl vinyl monomers, or combinations thereof, based on the total weight of the macromonomer. The phrase "non α-methyl vinyl monomer terminated with an α-methyl vinyl monomer" means that, when a vinyl monomer bearing no α-methyl group is present, as polymerized units, in the macromonomer, the macromonomer must be terminated by a unit derived from an α-methyl vinyl monomer. For example, while styrene might be present, as polymerized units, in a macromonomer chain, that macromonomer chain would be terminated by α-methyl styrene, or some other α-methyl vinyl monomer. Suitable α-methyl vinyl monomers include, for example, methacrylate esters, such as $C_1$ to $C_{18}$ normal, branched, or cyclic alkyl esters of methacrylic acid, including methyl methacrylate, ethyl methacrylate, butyl methacrylate, 2-ethylhexyl methacrylate, cyclohexyl methacrylate, isobornyl methacrylate, lauryl methacrylate, or stearyl methacrylate; hydroxyalkyl methacrylates such as hydroxyethyl methacrylate; glycidylmethacrylate; phenyl methacrylate; methacrylamide; methacrylonitrile; or combinations thereof.

One skilled in the art will recognize that there are many ways to prepare the macromonomer useful in the present invention. For example, the macromonomer may be prepared by a high temperature (e.g., at least 150° C.) continuous process such as disclosed in U.S. Pat. No. 5,710,227 or EP-A-1,010,706, published Jun. 21, 2000. In a preferred continuous process, a reaction mixture of first ethylenically unsaturated monomers is passed through a heated zone having a temperature of at least 150° C., and more preferably at least 275° C. The heated zone may also be maintained at a pressure above atmospheric pressure (e.g., greater than 3,000 kPa=greater than 30 bar). The reaction mixture of monomers may also optionally contain a solvent such as water, acetone, methanol, isopropanol, propionic acid, acetic acid, dimethylformamide, dimethylsulfoxide, methylethylketone, or combinations thereof.

The macromonomer useful in the present invention may also be prepared by polymerizing first ethylenically unsaturated monomers in the presence of a free radical initiator and a catalytic metal chelate chain transfer agent (e.g., a transition metal chelate). Such a polymerization may be carried out by a solution, bulk, suspension, or emulsion polymerization process. Suitable methods for preparing the macromonomer using a catalytic metal chelate chain transfer agent are disclosed in for example U.S. Pat. Nos. 4,526,945, 4,680,354, 4,886,861, 5,028,677, 5,362,826, 5,721,330, and 5,756,605; European publications EP-A-0199,436, and EP-A-0196783; and PCT publications WO 87/03605, WO 96/15158, and WO 97/34934.

Preferably, the macromonomer useful in the present invention is prepared by an aqueous emulsion free radical polymerization process using a transition metal chelate complex. Preferably, the transition metal chelate complex is a cobalt (II) or (III) chelate complex such as, for example, dioxime complexes of cobalt (II), cobalt (II) porphyrin complexes, or cobalt (II) chelates of vicinal iminohydroxyimino compounds, dihydroxyimino compounds, diazadihydroxyiminodialkyldecadienes, or diazadihydroxyiminodialkylundecadienes, or combinations thereof. These complexes may optionally include bridging groups such as $BF_2$, and may also be optionally coordinated with ligands such as water, alcohols, ketones, and nitrogen bases such as pyridine. Additional suitable transition metal complexes are disclosed in for example U.S. Pat. Nos. 4,694,054; 5,770,665; 5,962,609; and 5,602,220. A preferred cobalt chelate complex useful in the present invention is Co II $(2,3\text{-dioxyiminobutane-}BF_2)_2$, the Co III analogue of the aforementioned compound, or combinations thereof. The spatial arrangements of such complexes are disclosed in for example EP-A-199436 and U.S. Pat. No. 5,756,605.

In preparing macromonomer by an aqueous emulsion polymerization process using a transition metal chelate chain transfer agent, at least one first ethylenically unsaturated monomer is polymerized in the presence of a free radical initiator and the transition metal chelate according to conventional aqueous emulsion polymerization techniques. Preferably, the first ethylenically unsaturated monomer is an α-methyl vinyl monomer as previously described herein.

The polymerization to form the macromonomer is preferably conducted at a temperature of from 20° C. to 150° C., and more preferably from 40° C. to 95° C. The solids level at the completion of the polymerization is typically from 5 weight percent to 70 weight percent, and more preferably from 30 weight percent to 60 weight percent, based on the total weight of the aqueous emulsion.

The concentration of initiator and transition metal chelate chain transfer agent used during the polymerization process is preferably chosen to obtain the desired degree of polymerization of the macromonomer. Preferably, the concentration of initiator is from 0.2 weight percent to 3 weight percent, and more preferably from 0.5 weight percent to 1.5 weight percent, based on the total weight of monomer. Preferably, the concentration of transition metal chelate chain transfer agent is from 5 ppm to 200 ppm, and more preferably from 10 ppm to 100 ppm, based on the total monomers used to form the macromonomer.

The first ethylenically unsaturated monomer, initiator, and transition metal chelate chain transfer agent may be added in any manner known to those skilled in the art to carry out the polymerization. For example, the monomer, initiator and transition metal chelate may all be present in the aqueous emulsion at the start of the polymerization process (i.e., a batch process). Alternatively, one or more of the components may be gradually fed to an aqueous solution (i.e., a continuous or semi-batch process). For example, it may be desired to gradually feed the entire or a portion of the initiator, monomer, and/or transition metal chelate to a solution containing water and surfactant. In a preferred embodiment, at least a portion of the monomer and transition metal chelate are gradually fed during the polymerization, with the remainder of the monomer and transition metal chelate being present in the aqueous emulsion at the start of the polymerization. In this embodiment, the monomer may be fed as is, or suspended or emulsified in an aqueous solution prior to being fed.

Any suitable free radical initiator may be used to prepare the macromonomer. The initiator is preferably selected based on such parameters as its solubility in one or more of the other components (e.g., monomers, water); half life at the desired polymerization temperature (preferably a half life within the range of from about 30 minutes to about 10 hours), and stability in the presence of the transition metal chelate. Suitable initiators include for example azo compounds such as 2,2'-azobis (isobutyronitrile), 4,4'-azobis(4-cyanovaleric acid), 2,2'-azobis [2-methyl-N-(1,1-bis(hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof. Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. Metal promoters, such as iron, may also optionally be used in such redox initiator systems. Also, buffers, such as sodium bicarbonate may be used as part of the initiator system.

An emulsifier is also preferably present during the aqueous emulsion polymerization process to prepare the macromonomer. Any emulsifier may be used that is effective in emulsifying the monomers such as for example anionic, cationic, or nonionic emulsifiers. In a preferred embodiment, the emulsifier is anionic such as for example sodium, potassium, or ammonium salts of dialkylsulphosuccinates; sodium, potassium, or ammonium salts of sulphated oils; sodium, potassium, or ammonium salts of alkyl sulphonic acids, such as sodium dodecyl benzene sulfonate; sodium, potassium, or ammonium salts of alkyl sulphates, such as sodium lauryl sulfate; ethoxylated alkyl ether sulfates; alkali metal salts of sulphonic acids; C12 to C24 fatty alcohols, ethoxylated fatty acids or fatty amides; sodium, potassium, or ammonium salts of fatty acids, such as Na stearate and Na oleate; or combinations thereof. The amount of emulsifier in the aqueous emulsion is preferably from 0.05 weight percent to 10 weight percent, and more preferably from 0.3 weight percent to 3 weight percent, based on the total weight of the monomers.

The macromonomer thus prepared is emulsion polymerized with at least one second ethylenically unsaturated monomer to form a copolymer composition containing graft copolymer particles. The polymerization is carried out by providing the macromonomer as water insoluble particles in a macromonomer aqueous emulsion and the second ethylenically unsaturated monomer in a monomer composition. At least a portion of the macromonomer aqueous emulsion is combined with at least a portion of the monomer composition to form a polymerization reaction mixture that is polymerized in the presence of an initiator.

Although in no way intending to be bound by theory, it is believed that by providing the macromonomer in the form of water insoluble macromonomer particles in an aqueous emulsion, and the second ethylenically unsaturated monomer in a separate monomer composition, upon combination, the second ethylenically unsaturated monomer diffuses through the aqueous phase and then into the macromonomer particles where the polymerization occurs. Preferably, the diffusion of the second ethylenically unsaturated monomer into the macromonomer particles is evidenced by swelling of the macromonomer particles. It is an essential feature of the invention that, prior to being combined with the monomer composition, the macromonomers are present in plural discrete particles dispersed in the aqueous phase. Preferably, these plural macromonomer particles have previously been formed by aqueous emulsion polymerization, and the resultant macromonomer aqueous emulsion is combined with the monomer composition and subsequently polymerized without being isolated. Addition of the monomer composition to the macromonomer aqueous emulsion results initially in the presence of plural monomer droplets in the aqueous emulsion as separate entities distributed among, but not in direct contact with, the plural macromonomer particles. That is, the monomer droplets are separated from the macromonomer particles, and from each other, by an aqueous phase. Individual monomer molecules must then exit the monomer droplet, dissolve in the aqueous phase, diffuse through that aqueous phase to a macromonomer particle, and enter that macromonomer particle where polymerization to form the graft copolymer (i.e., comb copolymer) occurs. Because the water insoluble macromonomers are unable to diffuse through the aqueous phase, it is essential that the monomer droplets not include water insoluble macromonomer if gel formation is to be avoided and if the number of particles initially established by the macromonomer particles is to be maintained during polymerization of monomers with macromonomers.

The macromonomer aqueous emulsion useful in the present invention may be formed in any manner known to those skilled in the art. For example, the macromonomer, produced by any known method, may be isolated as a solid (e.g., spray dried) and emulsified in water. Also, for example, the macromonomer, if prepared via an emulsion or aqueous based polymerization process, may be used as is, or diluted with water or concentrated to a desired solids level.

In a preferred embodiment of the present invention, the macromonomer aqueous emulsion is formed from the emulsion polymerization of at least one first ethylenically unsaturated monomer in the presence of a transition metal chelate chain transfer agent as described previously herein. This embodiment is preferred for numerous reasons. For example, the macromonomer polymerization can be readily controlled to produce a desired particle size distribution (preferably narrow, e.g., polydispersity less than 2). Also, for example, additional processing steps, such as isolating the macromonomer as a solid, can be avoided, leading to better process economics. In addition, the macromonomer, macromonomer aqueous emulsion, and the graft copolymer can be prepared by consecutive steps in a single reactor which is desirable in a commercial manufacturing facility because process parameters, such as manufacturing cost and particle size distribution, may be optimized.

The "macromonomer aqueous emulsion" useful in the present invention contains from 20 weight percent to 60 weight percent, and more preferably from 30 weight percent to 50 weight percent of at least one water insoluble macromonomer, based on the total weight of macromonomer aqueous emulsion. The macromonomer aqueous emulsion may also contain mixtures of macromonomer. Preferably, the macromonomer aqueous emulsion contains less than 5 weight percent and more preferably less than 1 weight percent of ethylenically unsaturated monomer, based on the total weight of macromonomer aqueous emulsion.

The water insoluble macromonomer particles have a particle size chosen such that, upon addition of monomers, particles of graft copolymer (i.e., comb copolymer) having a desired particle size will be formed. For example, the final graft copolymer particle size is directly proportional to the initial particle size of the macromonomer and the concentration of second ethylenically unsaturated monomer in the polymerization reaction mixture, assuming all the particles participate equally in the polymerization. Preferably, the macromonomer particles have a weight average particle size of from 50 nm to 500 nm, and more preferably from 80 nm to 200 nm as measured by Capillary Hydrodynamic Fractionation technique using a Matec CHDF 2000 particle size analyzer equipped with a HPLC type Ultra-violet detector.

The macromonomer aqueous emulsion may also include one or more emulsifying agents. The type and amount of emulsifying agent is preferably selected in a manner to produce the desired particle size. Suitable emulsifying agents include those previously disclosed for use in preparing the macromonomer by an emulsion polymerization process. Preferred emulsifying agents are anionic surfactants such as, for example, sodium lauryl sulfate, sodium dodecylbenzene sulfonate, sulfated and ethoxylated derivatives of nonylphenols and fatty alcohols. The total level of emulsifying agent, based on the total weight of macromonomer is preferably from 0.2 weight percent to 5 weight percent and more preferably from 0.5 weight percent to 2 weight percent.

The "monomer composition" useful in the present invention contains at least one kind of second ethylenically unsaturated monomer. The monomer composition may contain all (i.e., 100%) monomer, or contain monomer dissolved or dispersed in an organic solvent and/or water. Preferably, the level of monomer in the monomer composition is from 50 weight percent to 100 weight percent, more preferably from 60 to 90 weight percent, and most preferably from 70 to 80 weight percent, based on the total weight of the monomer composition. Examples of organic solvents that may be present in the monomer composition include $C_6$ to $C_{14}$ alkanes. The organic solvent in the monomer composition will be no more than 30 weight percent, and more preferably no more than 5 weight percent, based on the total weight of the monomer composition.

In addition to water and/or organic solvent, the monomer composition may also optionally contain monomers containing functional groups, such as, for example, monomers containing hydroxy, amido, aldehyde, ureido, polyether, glycidylalkyl, keto groups or combinations thereof. These other monomers are generally present in the monomer composition at a level of from 0.5 weight percent to 15 weight percent, and more preferably from 1 weight percent to 3 weight percent based on the total weight of the graft copolymer. Examples of functional monomers include keto-functional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomer can provide crosslinking if desired.

In a preferred embodiment, the monomers in the monomer composition are pre-emulsified in water to form a "monomer aqueous emulsion". Preferably, the monomer aqueous emulsion contains monomer droplets having a droplet size from 1 micron to 100 microns, and more preferably from 5 micron to 50 microns. Any suitable emulsifying agent may be used, for example those previously described, to emulsify the monomer to the desired monomer droplet size. Preferably, the level of emulsifying agent, if present, will be from 0.2 weight percent to 2 weight percent based on the total weight of monomer in the monomer composition.

The second ethylenically unsaturated monomer of the monomer composition is preferably selected to provide the desired properties in the resulting comb copolymer composition. Preferably, the second ethylenically unsaturated monomers are chosen so that, when they have been polymerized to form the backbone of the comb copolymer, that backbone will preferably have a Tg of $-80°$ C. to $0°$ C., more preferably $-65°$ C. to $-20°$ C., and most preferably $-65°$ C. to $-40°$ C., as estimated herein above. Suitable ethylenically unsaturated monomers include for example methacrylate esters, such as $C_1$ to $C_{18}$ normal, branched, or cyclic alkyl esters of methacrylic acid, including methyl methacrylate, ethyl methacrylate, n-butyl methacrylate, 2-ethylhexyl methacrylate, cyclohexyl methacrylate, lauryl methacrylate, stearyl methacrylate, isobornyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, a-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; dienes such as 1,3-butadiene and isoprene; vinyl ethers; or combinations thereof. The ethylenically unsaturated monomer can also be an acid containing monomer or a functional monomer, such as those previously described herein. Preferably, the ethylenically unsaturated monomer of the monomer composition does not contain amino groups.

It is required that the composition of the monomers (i.e., the second ethylenically unsaturated monomers) of the monomer composition of the present invention be chosen such that the backbone of the comb copolymer formed therefrom will be not be miscible in the thermoplastic polymer. The solubility parameters of the backbone and the thermoplastic polymer can be estimated and compared to predict immiscibility by methods such as that of Van Krevelen, described herein above.

In a preferred embodiment, the monomer composition includes one or more ethylenically unsaturated monomers selected from $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; butadiene or combinations thereof.

As previously mentioned, the macromonomer aqueous emulsion and monomer composition are combined to form a "polymerization reaction mixture", and polymerized in the presence of a free radical initiator to form an "aqueous copolymer composition", also referred to herein as an "aqueous dispersion of a segmental copolymer". The term "polymerization reaction mixture," as used herein, refers to the resulting mixture formed when at least a portion of the macromonomer aqueous emulsion and at least a portion of the monomer composition are combined. The polymerization reaction mixture may also contain initiator or any other additive used during the polymerization. Thus, the polymerization reaction mixture is a mixture that changes in composition as the macromonomer and monomer (i.e., second ethylenically unsaturated monomer) of the monomer composition are reacted to form comb copolymer.

The macromonomer aqueous emulsion and monomer composition may be combined in various ways to carry out the polymerization. For example, the macromonomer aqueous emulsion and the monomer composition may be combined prior to the start of the polymerization reaction to form the polymerization reaction mixture. Alternatively, the monomer composition could be gradually fed into the macromonomer aqueous emulsion, or the macromonomer aqueous emulsion could be gradually fed into the monomer composition. It is also possible that only a portion of the macromonomer aqueous emulsion and/or monomer composition be combined prior to the start of the polymerization with the remaining monomer composition and/or macromonomer aqueous emulsion being fed during the polymerization.

The initiator can also be added in various ways. For example, the initiator may be added in "one shot" to the macromonomer aqueous emulsion, the monomer composition, or a mixture of the macromonomer aqueous emulsion and the monomer composition at the start of the polymerization. Alternatively, all or a portion of the initiator can be co-fed as a separate feed stream, as part of the macromonomer aqueous emulsion, as part of the monomer composition, or any combination of these methods.

The preferred method of combining the macromonomer aqueous emulsion, the monomer composition, and initiator will depend on such factors as the desired graft copolymer composition. For example, the distribution of the macromonomer as a graft along the backbone can be affected by the concentrations of both the macromonomer and the second ethylenically unsaturated monomers at the time of the polymerization. In this regard, a batch process will afford high concentration of both the macromonomer and the second ethylenically unsaturated monomers at the onset of the polymerization whereas a semi-continuous process will keep the second ethylenically unsaturated monomer concentration low during the polymerization. Thus, through the method by which the macromonomer aqueous emulsion and monomer composition are combined, it is possible to control, for example: the number of graft segments, derived from macromonomer, per polymer chain; the distribution of graft segments in each chain, and the length of the polymer backbone.

Initiators useful in polymerizing the macromonomer and second ethylenically unsaturated monomer include any suitable initiator for emulsion polymerizations known to those skilled in the art. The selection of the initiator will depend on such factors as the initiator's solubility in one or more of the reaction components (e.g. monomer, macromonomer, water); and half life at the desired polymerization temperature (preferably a half life within the range of from about 30 minutes to about 10 hours). Suitable initiators include those previously described herein in connection with forming the macromonomer, such as azo compounds such as 4,4'-azobis (4-cyanovaleric acid), peroxides such as t-butyl hydroperoxide; sodium, potassium, or ammonium persulfate; redox initiator systems such as, for example, persulphate or peroxide in combination with a reducing agent such as sodium metabisulfite, sodium bisulfite, sodium formaldehyde sulfoxylate, isoascorbic acid; or combinations thereof. Metal promoters, such as iron; and buffers, such as sodium bicarbonate, may also be used in combination with the initiator. Additionally, Controlled Free Radical Polymerization (CFRP) methods such as Atom Transfer Radical Polymerization; or Nitroxide Mediated Radical Polymerization may be used. Preferred initiators include azo compounds such as 4,4'-azobis(4-cyanovaleric acid).

The amount of initiator used will depend on such factors as the copolymer desired and the initiator selected. Preferably, from 0.1 weight percent to 1 weight percent initiator is used, based on the total weight of monomer and macromonomer.

The polymerization temperature will depend on the type of initiator chosen and desired polymerization rates. Preferably, however, the macromonomer and second ethylenically unsaturated monomer are polymerized at a temperature of from 0° C. to 150° C., and more preferably from 20° C. to 95° C.

The amount of macromonomer aqueous emulsion and monomer composition added to form the polymerization reaction mixture will depend on such factors as the concentrations of macromonomer and second ethylenically unsaturated monomer in the macromonomer aqueous emulsion and monomer composition, respectively, and the desired comb copolymer composition. Preferably, the macromonomer aqueous emulsion and monomer composition are added in amounts to provide a comb copolymer containing as polymerized units from 10 weight percent to 60 weight percent, more preferably from 15 weight percent to 50 weight percent, and most preferably from 20 weight percent to 40 weight percent macromonomer, and from 40 weight percent to 90 weight percent, more preferably from 50 weight percent to 85 weight percent and most preferably from 60 weight percent to 80 weight percent second ethylenically unsaturated monomer.

One skilled in the art will recognize that other components used in conventional emulsion polymerizations may optionally be used in the method of the present invention. For example, to reduce the molecular weight of the resulting graft copolymer, the polymerization may optionally be conducted in the presence of one or more chain transfer agents, such as n-dodecyl mercaptan, thiophenol; halogen compounds such as bromotrichloromethane; or combinations thereof. Also, additional initiator and/or catalyst may be added to the polymerization reaction mixture at the completion of the polymerization reaction to reduce any residual monomer, (e.g., chasing agents). Suitable initiators or catalysts include those initiators previously described herein. In addition, the chain transfer capacity of a macromonomer through addition-fragmentation can be utilized in part to reduce molecular weight through appropriate design of monomer compositions and polymerization conditions. See e.g., E. Rizzardo, et. al., Prog. Pacific Polym. Sci., 1991, 1, 77–88; G. Moad, et. al., WO 96/15157.

Preferably, the process of the present invention does not require neutralization of the monomer, or resulting aqueous graft copolymer composition. These components preferably remain in unneutralized form (e.g., no neutralization with a base if acid functional groups are present).

The resulting aqueous graft copolymer composition formed by polymerization of the macromonomer and the ethylenically unsaturated monomer in the monomer composition preferably has a solids level of from 30 weight percent to 70 weight percent and more preferably from 40 weight percent to 60 weight percent. The aqueous graft copolymer composition preferably contains graft copolymer particles that are water insoluble and have a particle size of from 60 nm to 500 nm, and more preferably from 80 nm to 350 nm.

The graft copolymer formed preferably has a backbone containing, as polymerized units, the second ethylenically unsaturated monomer from the monomer composition, and one or more macromonomer units, as polymerized units, wherein a terminal ethylenically unsaturated group of the macromonomer is incorporated into the backbone and the remainder of the macromonomer becomes a graft segment pendant to the backbone (i.e., a side chain) upon polymerization. Preferably, each side chain is a graft segment derived from the grafting of one macromonomer to the backbone. The degree of polymerization of the graft segments derived from the macromonomer is preferably from 10 to 1,000, more preferably from 20 to 1,000, and most preferably from 20 to 200, where the degree of polymerization is expressed as the number of polymerized units of ethylenically unsaturated monomer used to form the macromonomer. The weight average molecular weight of the graft copolymer (i.e., of the comb copolymer) is preferably in the range of from 50,000 to 2,000,000, and more preferably from 100,000 to 1,000,000. The number average molecular weight of a comb copolymer is typically less than the corresponding weight average molecular weight. The number average molecular weights of the comb copolymers of the present invention are at least 25,000, and typically range from 25,000 to 600,000. Molecular weights as used herein can be determined by size exclusion chromatography (SEC), also known as gel permeation chromatography (GPC).

In a preferred embodiment of the present invention, the polymerization is conducted in two stages. In the first stage, the macromonomer is formed in an aqueous emulsion polymerization process, and in the second stage the macromonomer is polymerized with the second ethylenically unsaturated monomer in an emulsion. For efficiency, preferably these two stages are conducted in a single vessel. For example, in the first stage, the macromonomer aqueous emulsion may be formed by polymerizing in an aqueous emulsion at least one first ethylenically unsaturated monomer to form water insoluble macromonomer particles. This first stage polymerization is preferably conducted using a transition metal chelate chain transfer agent as previously described herein. After forming the macromonomer aqueous emulsion, a second emulsion polymerization is preferably performed in the same vessel to polymerize the macromonomer with at least one second ethylenically unsaturated monomer. This second stage may be conducted for example by directly adding (e.g., all at once or by a gradual feed) the monomer composition and initiator to the macromonomer aqueous emulsion. One main advantage of this embodiment is that the macromonomer does not have to be isolated, and the second polymerization can take place simply by adding the monomer composition and initiator to the macromonomer aqueous emulsion. In this preferred embodiment, the particle size and particle size distribution of the plural water insoluble macromonomer particles may be precisely controlled, and later addition of more macromonomer aqueous emulsion would typically not be required, except when, for example, a second mode (particle size and/or composition) of graft copolymer is desired.

In another preferred embodiment of the present invention, the polymerization of the macromonomer and second ethylenically unsaturated monomer is at least partially performed in the presence of an acid containing monomer, acid containing macromonomer, or combinations thereof. The acid containing monomer or acid containing macromonomer may be added in any manner to the polymerization reaction mixture. Preferably, the acid containing monomer or acid containing macromonomer is present in the monomer composition. The acid containing monomer or acid containing macromonomer may also be added as a separate stream to the polymerization reaction mixture.

The amount of acid containing monomer or acid containing macromonomer added to the polymerization reaction mixture is typically from 0 to 10 weight percent, preferably from 0.2 weight percent to 10 weight percent, more preferably from 0.5 weight percent to 5 weight percent, and most preferably from 1 weight percent to 2 weight percent, based on the total weight of monomer and macromonomer added to the polymerization reaction mixture.

Acid containing monomers which may be used in this embodiment include ethylenically unsaturated monomers bearing acid functional or acid forming groups such as those previously described herein. The "acid containing macromonomer" useful in this embodiment is any low molecular weight polymer having at least one terminal ethylenically unsaturated group that is capable of being polymerized in a free radical polymerization process, and that is formed from at least one kind of acid containing monomer. Preferably, the amount of acid containing monomer present, as polymerized units, in the acid containing macromonomer is from 50 weight percent to 100 weight percent, more preferably from 90 weight percent to 100 weight percent, and most preferably from 95 weight percent to 100 weight percent.

The acid containing macromonomer may be prepared according to any technique known to those skilled in the art such as those previously described herein. In a preferred embodiment of the present invention, the acid containing macromonomer is prepared by a solution polymerization process using a free radical initiator and transition metal chelate complex. Such a process is disclosed in, for example, U.S. Pat. No. 5,721,330. Preferred acid containing monomers used to form the acid containing macromonomer are α-methyl vinyl monomers such as methacrylic acid.

In another preferred embodiment of the present invention, a "macromolecular organic compound" having a hydrophobic cavity is present in the polymerization medium used to form the macromonomer and/or aqueous copolymer composition. Preferably, the macromolecular organic compound is used when copolymerizing ethylenically unsaturated monomers with very low water solubility such as lauryl or stearyl acrylates and/or methacrylates. By "very low water solubility" it is meant a water solubility at 25° C. to 50° C. of no greater than 50 millimoles/liter. For example, the macromolecular organic compound may be added to the monomer composition, the macromonomer aqueous emulsion, or the polymerization reaction mixture used to form the aqueous copolymer composition. Also, for example, the macromolecular organic compound may be added to an aqueous emulsion of ethylenically unsaturated monomer used to form the macromonomer. Suitable techniques for using a macromolecular organic compound having a hydrophobic cavity are disclosed in, for example, U.S. Pat. No. 5,521,266.

Preferably, the macromolecular organic compound having a hydrophobic cavity is added to the polymerization reaction mixture to provide a molar ratio of macromolecular organic compound to very low water solubility monomer or macromonomer of from 5:1 to 1:5000 and more preferably from 1:1 to 1:500.

Macromolecular organic compounds having a hydrophobic cavity useful in the present invention include for example cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

Monomers having low water solubility include for example primary alkenes; styrene and alkylsubstituted styrene; α-methyl styrene; vinyltoluene; vinyl esters of $C_4$ to $C_{30}$ carboxylic acids, such as vinyl 2-ethylhexanoate, vinyl neodecanoate; vinyl chloride; vinylidene chloride; N-alkyl substituted (meth)acrylamide such as octyl acrylamide and maleic acid amide; vinyl alkyl or aryl ethers with ($C_3$–$C_{30}$) alkyl groups such as stearyl vinyl ether; ($C_1$–$C_{30}$) alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate; unsaturated vinyl esters of (meth)acrylic acid such as those derived from fatty acids and fatty alcohols; multifunctional monomers such as pentaerythritol triacrylate; monomers derived from cholesterol or combinations thereof.

In another aspect of the present invention an aqueous copolymer composition is provided that is preferably produced by the method of the present invention as previously described herein. The aqueous copolymer composition contains water insoluble particles of graft copolymer that are preferably comb copolymer particles. The comb copolymer particles preferably have a weight average particle size of from 50 nm to 500 nm, and more preferably from 80 nm to 350 nm.

The second ethylenically unsaturated monomer may be any ethylenically unsaturated monomer that provides desirable properties in the copolymer particles, such as those useful in the monomer composition as previously described herein. Preferably, the backbone of the comb copolymer is linear. Compositionally, the backbone of the comb copolymer preferably contains polymerized units of the second ethylenically unsaturated monomer derived from the monomer composition.

Although the backbone of the comb copolymer may be branched, with such branching including, for example, "star" structures, it is preferred that the backbone is linear. Compositionally, the backbone of the copolymer preferably contains polymerized units of the second ethylenically unsaturated monomer derived from the monomer composition.

The weight ratio of the graft segment of the comb copolymer to the backbone of the comb copolymer is preferably 10:90 to 60:40, more preferably 15:85 to 50:50, and most preferably 20:80 to 40:60.

Preferably, the Tg of the backbone of the comb copolymer is from −80° C. to 0° C., more preferably from −65° C. to −20° C., and most preferably from −65° C. to −40° C.

It is further required that the composition of the backbone of the comb copolymer will be such that the backbone is not miscible in the thermoplastic polymer of the invention.

The pendant graft segments of the comb copolymer preferably contain polymerized units of the macromonomer. In a preferred embodiment of the present invention, each graft segment is derived from one macromonomer. Additionally, the pendant graft segments contain less than 5 weight percent and more preferably less than 1 weight percent of the polymerized second ethylenically unsaturated monomer derived from the monomer composition, based on the total weight of the pendant graft segments.

Preferably, the Tg of the graft segment of the comb copolymer is from 50° C. to 180° C., more preferably from 50° C. to 130° C., and most preferably from 70° C. to 110° C.

It is further preferred that the graft segment is miscible with the thermoplastic polymer of the present invention. Although not wishing to be bound be any particular theory, it is thought that this miscibility of the graft segment is desirable because favorable interaction of the graft segment with the thermoplastic polymer renders the comb copolymer compatible with the thermoplastic polymer. In this way, domains of the backbone, which is preferably not miscible with the thermoplastic polymer, are uniformly distributed throughout the thermoplastic article that is ultimately formed, and such uniform distribution is directly correlated with enhanced toughness. The solubility parameters of the graft segment and the thermoplastic polymer can be estimated and compared to predict miscibility by methods such as that of Van Krevelen, described herein above. Used herein, the meaning of the term "compatible" is the same as that commonly used in the art. Two polymers that are completely, or partially, immiscible may still be uniformly dispersed in each other. Such uniform distributions are observed when a favorable interaction exists between one polymer (herein, the thermoplastic polymer) and a portion of another polymer (herein, the graft segment of the comb copolymer). In addition to more uniform distribution, the adhesion of one phase (i.e., the backbone of the comb copolymer) with the other phase (i.e., the matrix phase which is the thermoplastic polymer) is enhanced due to an interphase which includes the thermoplastic polymer and the graft segment. Such enhanced adhesion is further directly correlated with improved impact.

In a preferred embodiment of the present invention, the water insoluble comb copolymer particles typically contain from 0 weight percent to 10 weight percent, preferably 0.2 weight percent to 10 weight percent, more preferably from 0.5 weight percent to 5 weight percent, and most preferably from 1 weight percent to 2 weight percent of an acid containing macromonomer, based on the total weight of the graft copolymer. The acid containing macromonomer preferably has a composition as previously described herein.

Although in no way intending to be bound by theory, it is believed that the "acid containing macromonomer" is attached to the surface of the water insoluble graft copolymer particles and provides stability. By "attached," as used herein, it is believed that the acid containing macromonomer is bound in some manner (e.g., covalent, hydrogen bonding, ionic) to a polymer chain in the particle. Preferably, the acid containing macromonomer is covalently bound to a polymer chain in the particle. It has been found that the acid containing macromonomer provides stability to the particles such that the aqueous copolymer composition produced exhibits unexpected improved shear stability; freeze thaw stability; and stability to additives in formulations, as well as reduction of coagulum during the polymerization. Although improved stability can be achieved using acid containing monomer, these benefits are most dramatic when an acid containing macromonomer is used.

The comb copolymer of the present invention may be isolated as powders, or other solid particles, from dispersions containing it (e.g., aqueous emulsions) by methods well known in the art. These methods include, for example, spray drying, coagulation and oven drying, freeze drying, and devolatilizing extrusion.

The thermoplastic polymer of the present invention may be any thermoplastic polymer known to the art. Preferably, the thermoplastic polymer is a polymer selected from the group consisting of poly(vinyl halide), ABS terpolymer, poly(styrene-acrylonitrile) (SAN), poly(styrene-acrylonitrile-acrylate) (ASA), polyaromatics such as poly (styrene), poly(vinyl acetate), poly(vinyl methyl ether) (PVME), chlorinated polyethylene (CPE), phenoxy (polyhydroxypropylether of bisphenol A), poly (methylmethacrylate) (PMMA), poly(styrene-maleic anhydride) (SMA), poly(ethylene-vinyl acetate) (EVA), polyesters such as polybutyleneterephthalate (PBT), polyethyleneterephthalate (PET), polyamides, polyacetal (POM), polyurethane (PU), polyolefin (PO), polycarbonate (PC), and combinations thereof. More preferably, the thermoplastic polymer is a polymer selected from the group consisting of poly(vinyl halide), ABS terpolymer, and combinations thereof. Most preferably, the thermoplastic polymer is poly(vinyl chloride). The acronyms in parentheses above are the ASTM D4000 acronyms.

The term "poly(vinyl halide)" is used generically herein to define not only poly(vinyl chloride), but also analogous polymers, such as poly(vinyl bromide), and chlorinated polyvinyl chloride; poly(vinylidene chloride) and its derivatives, including poly(vinylidene chloride-vinyl acetate); and vinyl chloride copolymers or terpolymers having vinyl chloride as the major component (greater than 50% by weight). These copolymers and terpolymers include, as polymerized units, comonomers of vinyl alkanoates such as vinyl acetate; vinylidene halides such as vinylidene chloride; alkyl esters of carboxylic acids such as acrylic acid, ethyl acrylate, and 2-ethylhexyl acrylate; unsaturated hydrocarbons such as ethylene, propylene, and isobutylene; and, allyl compounds, such as allyl acetate.

The term "ABS terpolymer" is used generically herein not only to define a terpolymer of acrylonitrile, butadiene, and styrene, but also analogous polymers in which the ABS comonomers have been replaced in whole or in part by analogous comonomers, as polymerized units. For example, acrylonitrile is replaced by, or supplemented with methacrylonitrile, ethacrylonitrile, or halogenated acrylonitriles; styrene is replaced by, or supplemented with alpha-methyl styrene, chlorostyrene, or vinyl toluene; butadiene is replaced by, or supplemented with isoprene.

In order to produce the thermoplastic article of the present invention, the comb copolymer and the thermoplastic polymer are combined to form the solids blend of the present invention. Such blending may be accomplished, for example, by hand blending, by use of intensive mixing devices such as a Henshel mixer (available from Henschel Mixers Americas, Houston, Tex.), by pre-extrusion to form pellets, or by any other method known in the art, including combination of comb copolymer and thermoplastic polymer wherein one or both are in the form of a liquid dispersion (e.g., in water), followed by drying.

The solids blend is then subjected to heating and mixing to form the melt blend of the present invention. This heating and mixing can be accomplished by any technique common to the art. For example, heating and mixing to form a melt blend may be accomplished using an intensive mixing device such a Haake Bowl (available from Haake Buchler Instruments, Saddlebrook, N.J.), an extruder, a two-roll mill, or a calendaring device.

The melt blend is shaped to form the thermoplastic article of the present invention by any technique common to the art. Equipment used to shape the melt blend includes, for example, dies, presses, molds, and blow molds. The articles thus formed are typically cooled to room temperature. The articles of the present invention may further be laminated to other thermoplastic compositions or thermoset compositions by techniques know in the art, such as, for example, co-extrusion. The article of the present invention may also be affixed directly to other substrates, such as for example wood or metal, with or without the use of an adhesive. Any type of thermoplastic article common to the art may be made by the method of the present invention. A non-exhaustive list of these articles includes, for example: construction materials, such as siding, gutters, downspouts, pipe, pipe fittings, wallboard, wall-coverings, molding, fencing, decking, window frames and profiles; consumer goods such as bottles, jars, other containers, films, and laminates; appliance housing such as housings for computers, refrigerators, and air conditioners, as well as interior appliance parts; both interior and exterior automotive parts such as body side molding, and instrument and door panels; packaging materials; rigid film and sheet such as credit cards and computer disks; toys; and plastic parts such as screws, gears, and wires.

The amount of comb copolymer contained in the composition of the present invention, which includes the solids blend, the melt blend, and the thermoplastic article, is preferably 2 to 40 PHR, more preferably 3 to 30 PHR, and most preferably 4 to 20 PHR, wherein PHR refers to parts by weight of comb copolymer per hundred parts by weight of thermoplastic polymer.

Typically, the comb copolymer of the present invention is present in an amount sufficient to increase the "impact resistance energy" of the thermoplastic article, defined herein above, by at least 15 percent compared to an article formed identically, absent the comb copolymer. Preferably, the amount comb copolymer will be sufficient to increase the impact resistance energy of the article from 15% to 2,000%, more preferably from 50% to 1000%, and most preferably from 50% to 600%, when compared with an article formed identically, absent the comb copolymer.

Certain lubricants, stabilizers, and the like are often incorporated into the compositions, which include solids blends, melts blends, and thermoplastic articles. The stabilizers serve to prevent the breakdown of the thermoplastic polymer (e.g., poly(vinyl chloride)) and are of several different types. Two varieties stabilize against thermal and ultraviolet light stimulated oxidative degradation, mechanical degradation, and discoloration.

Other additives to the blends prepared in accordance with the present invention may include, for example: colorants, including organic dyes, such as anthraquinone red, organic pigments such as phthalocyanine blue, and inorganic pigments such as titanium dioxide, cadmium sulfide; fillers and particulate extenders such as carbon black, amorphous silica, asbestos, glass fibers, and magnesium carbonate; plasticizers such as dioctyl phthalate, dibenzyl phthalate, butyl benzyl phthalate, hydrocarbon oils, the macromonomer of the present invention, and other oligomers. Other impact modifiers, such as typical crosslinked core/shell poly(butadiene/styrene)/poly(methacrylate) modifiers and crosslinked poly(butyl acrylate)/poly(methacrylate) may also be present.

While only a few of such materials have been specifically recited, it is not intended to exclude others; the recitation is exemplary only, and each category of additives is common and well-known in the art. The inclusions can be made at any stage of preparation in accordance with accepted techniques well-known to those ordinarily skilled in the art, in proportions which are commonly employed. Such additional materials are not of particular significance in the present invention.

Experimental
Molecular Weight Determination Using Gel Permeation Chromatography (GPC)

Gel Permeation Chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in *A Guide to Materials Characterization and Chemical Analysis*, J. P. Sibilia; VCH, 1988, p.81–84.

For example, the molecular weight information for a low molecular weight sample (e.g., 10,000) may be determined as follows: The sample (an aqueous emulsion containing low molecular weight particles) is dissolved in THF at a concentration of approximately 0.1% weight sample per volume THF, and shaken for 6 hours, followed by filtration through a 0.45 $\mu$m PTFE (polytetrafluoroethylene) membrane filter. The analysis is performed by injecting 100 $\mu$l of the above solution onto 3 columns, connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is via differential refractive index. The system was calibrated with narrow polystyrene standards. PMMA-equivalent molecular weights for the sample are calculated via Mark-Houwink correction using K=14.1×10$^{-3}$ ml/g and a=0.70 for the polystyrene standards and K=10.4×10$^{-3}$ ml/g and a=0.697 for the sample.

Experimental.

Some embodiments of the invention will now be described in detail in the following Examples. The following abbreviations shown in Table 1 are used in the examples.

TABLE 1

Abbreviations

| Abbreviation | Description |
|---|---|
| A-16-22 | Polystep ™ A-16-22, anionic surfactant, supplied as 22% solids by Stepan Company, located in Northfield, Illinois. |
| OT-75 | Aerosol ™ OT-75 sodium dioctyl sulfosuccinates, Cytec Industries B.V., Botlek-Rotterdam, The Netherlands. |
| BA | Butyl acrylate |
| EA | Ethyl acrylate |
| MMA | Methyl methacrylate |
| BMA | Butyl methacrylate |
| MAA | Methacrylic acid |
| CoBF | Co(II)-(2,3-dioxyiminobutane-BF$_2$)$_2$ |
| CVA | 4,4-azobis(4-cyanovaleric acid) |
| Fe | 0.15% Ferrous sulfate in water |
| DBS | Dodecyl benzene sulfonate |
| GC | Gas chromatograph |
| SEC | Size exclusion chromatography |
| HPLC | High performance liquid chromatography |
| Init. | Initiator |
| IR | Infrared spectroscopy |
| LCCC | Liquid chromatography under critical conditions |
| NaPS | Sodium persulfate |
| Na$_2$CO$_3$ | Sodium bicarbonate |
| Mn | Number average molecular weight |
| MM | Macromonomer |
| PMAA-MM | Poly-methacrylic acid macromonomer |
| MM | Macromonomer |
| PMMA-MM | Poly-methyl methacrylate macromonomer |
| Poly-(BA-g-BMA) | Graft copolymer of BA with BMA side chains |
| Poly-(BA-g-MMA) | Graft copolymer of BA with MMA side chains |
| Wako VA-044 | 2,2'-azobis[2-(2-imidazolin2-2yl)propane]dihydrochloride |

In the Examples, monomer conversion was determined by GC analysis of unreacted monomer using standard methods. Weight percent solids for the macromonomer and copolymer compositions were determined by gravimetric analysis. Particle size of the macromonomer and copolymer compositions were obtained using a Matec CHDF 2000 particle size analyzer equipped with a HPLC type Ultra-violet detector.

Macromonomer was measured for number average molecular weight by SEC using a polystyrene standard from Polymer Laboratories (PS-1) having a peak average molecular weight ranging from 580 to 7,500,000 with narrow molecular weight distribution. Conversions from polystyrene to PMMA were made using Mark-Houwink constants. Copolymer compositions were evaluated for number average molecular weight and weight average molecular weight using SEC as described above.

EXAMPLES 1.1 TO 1.9

Preparation of Macromonomers by Emulsion Polymerization

Macromonomer (MM) was prepared by emulsion polymerization processes in Examples 1.1 to 1.9. The polymerization was conducted in a 5-liter, four neck round bottom reaction flask equipped with a mechanical stirrer, temperature control device, condenser, monomer feed line and a nitrogen inlet except for example 1.4 which was prepared in a 5 gallon reactor with similar attachments. The specific amounts of water, surfactant, monomers, chain transfer agent (CTA), and initiator used in Examples 1.1 to 1.9 are shown in Table 2. These ingredients were added according to the following procedure. In a different flask from the reaction flask, a monomer solution was prepared by dissolving the chain transfer agent in the monomer mixture consisting of all the monomers listed in Table 2 under a nitrogen purge. Deionized water and surfactant were introduced into the reaction flask at room temperature to form a water surfactant solution. The water surfactant solution was mixed and heated to 80° C. with stirring under a nitrogen purge. Upon reaching a temperature of 80° C., and upon complete dissolution of the surfactant, the initiator (CVA) was added to the water surfactant solution with stirring for 2 minute to permit the initiator to dissolve. After dissolution of the initiator, MMA (245 g for example 1.4, and 63 g for all other examples, was introduced into the reaction flask and allowed to react for 10 minutes. At the end of 10 minutes, 20 percent by weight of the monomer solution was added to the reaction flask with stirring. Following this initial charge, the remaining monomer solution was fed over a period of 2 hours, with stirring, to form a reaction mixture. At the end of the feed period, the reaction mixture was maintained at 80° C. for an additional 2 hours. The reaction mixture was then cooled to room temperature and passed through a filter cloth to remove any coagulum.

Generally, the resulting macromonomer emulsion contained less than 5 weight percent coagulum based on the total weight of macromonomer, and the conversion of monomer was over 99 weight percent, based on the total weight of monomer added. The Mn, weight percent solids and particle size for each macromonomer are reported in Table 2.

TABLE 2

Preparation of Macromonomers (MM)

| Examples | H$_2$O (g) | Surf. (g)[3] | MMA (g) | BMA | EA | Other | CTA grams[1] | Init. (g)[2] | Part. Size (nm) | Mn | Wt % Solids |
|---|---|---|---|---|---|---|---|---|---|---|---|
| 1.1 | 2380 | 55 | 1018 | — | 179.6 | — | 0.084 | 12.6 | 90 | 21287 | 33.8 |
| 1.2 | 2300 | 51 | 891.6 | 223 | — | — | 0.1 | 11.8 | 96 | 11738 | 31.2 |
| 1.3 | 2380 | 16[4] | 1018 | — | 179.6 | — | 0.16 | 12.6 | 99 | 6717 | 34.1 |
| 1.4 | 13232 | 306 | 6655 | — | — | — | 0.42 | 70 | 83 | 3937 | 34.1 |
| 1.5 | 2300 | 51 | 950 | — | — | 50[5] | 0.1 | 12 | 90 | 10000 | 34 |
| 1.6[10] | 2300 | 51 | 950 | — | — | 50[6] | 0.1 | 12 | 90 | 10000 | 34 |
| 1.7[10] | 2300 | 51 | 950 | — | — | 50[7] | 0.1 | 12 | 90 | 10000 | 34 |
| 1.8[10] | 2300 | 51 | — | — | — | 1000[8] | 0.1 | 12 | 90 | 10000 | 34 |
| 1.9[10][11] | 2300 | 55 | 500 | | | 500[9] | 0.2 | 12.6 | 90 | 10000 | 34 |

[1]Chain transfer agent (CoBF)
[2]CVA, supplied by Aldrich as a 75 weight percent aqueous solution of initiator.
[3]A-16-22 except for [4]
[4]OT-75
[5]Methacrylic acid
[6]Hydroxyethyl methacrylate
[7]Glycidyl methacrylate
[8]Cyclohexyl methacrylate
[9]Lauryl methacrylate
[10]The values listed from Examples 1.6–1.9 are the values one would use in preparation of the corresponding macromonomers.
[11]20 g of methyl-β-cyclodextrin solution (50% active) is added prior to monomer feed.

EXAMPLE 2

Preparation of PMAA-MM by Solution Polymerization

MAA macromonomer (PMAA-MM) was prepared by aqueous solution polymerization in a 2-liter baffled flange flask equipped with a mechanical stirrer, condenser, temperature control device, initiator feed lines and a nitrogen inlet. The apparatus was purged with nitrogen for 30 minutes after 0.018 g of CoBF was added. Deionized water, 1080 g, was charged to the flask and heated to 55° C. under a nitrogen purge. A monomer mixture containing 510 ml of MAA and 0.01 g of CoBF was prepared separately under nitrogen. When the deionized water reached a temperature of 55° C., 1.94 g of initiator (Wako VA-044) was added to the reaction flask. Following the addition of the initiator, the monomer mixture was added over a period of 60 minutes to the reaction flask with stirring. The temperature was then held at 55° C. for 2 hours following completion of the monomer mixture feed. Upon cooling the reaction flask to room temperature, the MAA-MM (Example 2.1) was isolated as dried polymer by rotary evaporation. The number average molecular weight (Mn) of the MAA-MM was determined by proton nuclear magnetic resonance to be 4030 based on the integration of the vinyl end group with respect to the methyl and methylene groups of the polymer chain.

EXAMPLE 3

Preparation of Acrylic Graft Copolymers by Semi-continuous Process

In Examples 3.1 to 3.9, graft copolymers were prepared by a semi-continuous emulsion polymerization process in a 5-liter round bottom flask with four neck equipped with a mechanical stirrer, temperature control device, initiator feed lines and a nitrogen inlet. The specific amounts of Macromonomer (MM, as emulsion), water, surfactant, monomers, acid containing monomers, and initiator used in Examples 3.1 to 3.9 are shown in Table 3. These ingredients were added according to the following procedure. A monomer emulsion of deionized water ($H_2O$ #2 in Table 3), surfactant, and monomers (as listed in Table 3) was prepared in a separate flask. Deionized water ($H_2O$ #1 in Table 3), MM from the example indicated in Table 1 and 20% of the monomer emulsion were introduced into the reaction flask at room temperature to form a reaction mixture. The reaction mixture was heated to 85° C. while stirring under a nitrogen purge. Upon reaching 85° C., the initiator and buffer solutions were introduced into the reaction flask. The remaining monomer emulsion was added over a period of 30 minutes with the temperature maintained at 90° C. Upon completion of the feeds, the reaction mixture was maintained at the reaction temperature for a period of 1 hours. The resulting copolymer composition was analyzed for conversion and other properties as described in Example 5. The conversion of BA, determined by standard GC methods, was greater than 99 weight percent based on the total weight of BA charged.

Characterization of Example 3 Copolymer Compositions.

Graft copolymer compositions prepared in the previous examples were characterized by various analytical techniques to determine wt % solids, particle size, weight average molecular weight, number average molecular weight, and percent incorporation of macromonomer.

Determination of the amount of unreacted macromonomer was carried out by HPLC analysis using the following procedure. The copolymer compositions were dissolved in THF and analyzed by gradient elution on an LC-18 column supplied by Supelco, located in Bellefonte, Pa. such that a well-isolated peak was observed for the unreacted macromonomer. Quantification was carried out by calibrating the detector response using known standards of the same macromonomer employed in the synthesis. The results of the characterization are reported in Table 4 below.

TABLE 4

Characterization Of Copolymer Compositions

| Example | % Solids | Particle Size (nm) | Mw ($\times 10^{-3}$) | Mn ($\times 10^{-3}$) | PMMA-MM Incorp.[1] (wt %) |
|---|---|---|---|---|---|
| 3.1 | 39.6 | 112 | 1541 | 206 | 92 |
| 3.2 | 41.3 | 107 | 1072 | 234 | 93 |
| 3.3 | 43.6 | 130 | 240 | 44 | 83 |
| 3.4 | 44.1 | 114 | 1082 | 107 | |
| 3.5 | 40 | 100 | | | |
| 3.6 | 40 | 100 | | | |
| 3.7 | 40 | 100 | | | |
| 3.8 | 40 | 100 | | | |
| 3.9 | 40 | 100 | | | |

[1]Based on the total weight of macromonomer added to reaction vessel.

All samples were isolated to dry polymer by freezing the emulsion polymers to induce coagulation followed by drying at 40° C. in a vacuum oven until moisture content was less than 0.5% based on polymer.

TABLE 3

Preparation of Acrylic Graft Copolymers by Semi-Continuous Process

| Example | MM[1] Ex | Amt. (g) | $H_2O$ #1 (g) | $H_2O$ #2 (g) | Surf.[2] (g) | BA (g) | EHA (g) | Temp. (° C.) | Init.[4] (g) | Buffer[5] (g) | Add. (g) |
|---|---|---|---|---|---|---|---|---|---|---|---|
| 3.1 | 1.1 | 1817 | 400 | 203 | 29.7 | 1141 | — | 90 | 1.22 | — | 0.35[7] |
| 3.2 | 1.2 | 1469 | — | 310 | 15.4 | 456.6 | — | 90 | 0.63 | — | — |
| 3.3 | 1.3 | 1500 | 454 | 334 | 9.8[8] | — | 941 | 90 | 1.01 | — | 0.29[7] |
| 3.4 | 1.4 | 1801 | 400 | 203 | 29.7 | 1115 | — | 90 | 1.22 | 1.22 | 26.5[6] |
| 3.5[9] | 1.5 | 1500 | 400 | 200 | 30 | 947 | — | 90 | 1.2 | — | — |
| 3.6[9] | 1.6 | 1500 | 400 | 200 | 30 | 947 | — | 90 | 1.2 | — | — |
| 3.7[9] | 1.7 | 1500 | 400 | 200 | 30 | 947 | — | 90 | 1.2 | — | — |
| 3.8[9] | 1.8 | 1500 | 400 | 200 | 30 | 947 | — | 90 | 1.2 | — | — |
| 3.9[9] | 1.9 | 1265 | 500 | 202 | 14.9 | 418 | — | 90 | 0.6 | — | — |

[1]Macromonomer emulsion prepared by method of Example 1.
[2]Ethoxylated $C_6$ to $C_{18}$ alkyl ether sulfate having from 1 to 40 ethylene oxide groups per molecule (30% active in water). Except for example 3.1.
[4]NaPS dissolved in 10 g of water.
[5]Sodium carbonate dissolved in 15 g of water.
[6]PMAA-MM (prepared by method of Example 2.1)
[7]Dodecylmercaptan
[8]OT-75
[9]The values listed from Examples 3.5–3.9 are the values one would use in preparation of the corresponding acrylic graft copolymers (i.e., comb copolymer).

TABLE 5

Master Batch Formulation

| Ingredient-source | Part per hundred on PVC (PHR) | Weight, grams |
|---|---|---|
| PVC (Geon ™ 103) Polyone, Ohio | 100 | 2613 |
| Advastab ™ TM-181 Rohm and Haas, PA | 0.9 | 23.52 |
| Hostalub XL-165 Clariant, NC | 0.9 | 23.52 |
| Calcium Stearate | 1.4 | 36.58 |
| AC-629A Allied Signal, NJ | 0.1 | 2.61 |
| CaCO$_3$ (Omya UFT) Omya Inc, VT | 10 | 261.3 |
| TiO$_2$ (RCL-4) SCM Pigments, MD | 1 | 26.13 |
| Paraloid ™ K-120N Rohm and Haas, PA | 1 | 26.14 |
| Paraloid ™ K-175 Rohm and Haas, PA | 0.5 | 13.07 |

Masterbatch Preparation.

The masterbatch was made by blending the ingredients listed in Table 5 on a Henschel blender. After the PVC was charged and the blades began turning, the blender temperature increased from frictional heating at approximately 3–5° C./min. After the PVC was charged, the remaining ingredients were added through the addition port when the temperature reached the values listed below. The PVC was charged to the blender at 25° C., and the lid was closed. Power to the mixing blades was turned on, and the RPM of the blades was adjusted to 1000 rpm. Advastab™ TM-181 stabilizer was added when the temperature reached 52° C. Loxiol™ VPG-1304 and OP Wax lubricants were added at 55° C. Paraloid™ K-175 lubricating processing aid and Paraloid™ K-120N processing aid were next added at 77° C., followed by TiO$_2$ at 88° C. and CaCO$_3$ at 90° C. Cooling water flow was started at 100° C., and the blade speed was reduced to 200 RPM. Cooling was continued until 45° C. was reach, at which time the blades were turned off and the masterbatch was removed from the blender.

Preparation and Testing of Charpy Specimens.

Powders of test polymers at the specified levels were blended by bag shaking with the master batch shown in Table 5. Each formulation (200 grams) was processed on a two roll mill (Collin ww150P, Ebersberg Germany) with front roll at 26 RPM and back roll at 20 RPM for 6 minutes at 190° C. and then pressed into 0.3175 cm thick sheet at 190° C. by preheating for 2 minutes at 10,000 PSI, followed by 3 minutes at 72,000 psi, followed by cooling at 72,000 psi for 3 minutes to 25° C.

Samples were tested for Charpy impact resistance according to British Institute method 7413.1991. Sample thickness was 0.599 cm and width 0.249 cm. The notch (45°) was 0.119 cm deep with a 0.013 cm radius at the bottom. The number of test specimens (i.e., samples) used to determine the impact energy at a given temperature and PHR of comb copolymer was ten (10).

TABLE 6

Charpy Impact Resistance Results

| Example Number for Charpy Specimens | Example Number for comb copolymer | Loading level (parts per hundred on PVC) PHR | Charpy Impact (KJ/M$^2$) Tested at 15° C. | Charpy Impact (KJ/M$^2$) Tested at 23° C. |
|---|---|---|---|---|
| Comparative A | Masterbatch only | 0 | 6.8 clean break | 10.7 clean break |
| 4 | 3.1 (a) | 5.8 | 9.6 clean break | 15.5 clean break |
| 5 | 3.1 | 11.6 | 9.8 clean break | 17.4 clean break |
| 6 | 3.1 | 17.4 | 14.7 clean break | 61.5 Hinged |
| 7 | 3.1 | 23.2 | 4.4 clean break | 5.7 clean break |
| 8 | 3.3 (b) | 5.8 | 12.4 clean break | 15.7 clean break |
| 9 | 3.3 | 11.6 | 11.1 clean break | 17.9 clean break |
| 10 | 3.3 | 17.4 | 2.4 clean break | 2.5 clean break |
| 11 | 3.4 (c) | 5.8 | 7.6 clean break | 12.3 clean break |
| 12 | 3.4 | 11.6 | 8.8 clean break | 15.2 clean break |
| 13 | 3.4 | 17.4 | 12.6 clean break | 20.2 clean break |
| 14 | 3.4 | 23.2 | 15.1 clean break | 56.5 Hinged break |

(a) 3.1–65 BA/35% (85 MMA/15 EA Macromonomer)
(b) 3.3–65 EHA/35% (85 MMA/15 EA Macromonomer)
(c) 3.4–63.5 BA/35% (100 MMA Macromonomer)/1.5% MAA Macromonomer)

Table 6 shows that the addition of comb copolymer improves the impact resistance of PVC. Depending on composition, there is an optimum use level where increasing the level beyond the optimum level results in a decrease in impact resistance. Levels as high as 23 PHR on PVC resin in the formulation for Example 3.4 continue to shown an increase in impact.

Processing Improvement.

It is known in the art that adding conventional, core-shell type impact modifiers increases melt viscosity of PVC formulations. As the use level increases, melt viscosity will increase. This can be seen in melt pressure in the extruder which is proportional to melt viscosity and also as an increase in electrical power demand as seen in percent extruder load. Reducing melt viscosity is valuable in that it lowers processing cost by allowing higher through put for the same energy demand.

Processability was measured by extruding PVC formulations into 0.127 cm by 15.24 cm sheet using a Milacron CM35 twin screw extruder (Batavia Ohio). Extruder zone temperatures were 182° C. (zone 1) 185° C. (zone 2), and 187.8° C. (zone 3). The screw speed was 18 RPM, and the melt temperature under these conditions was 187.2° C. The two formulations compared in this test of processability are shown in Table 7. A conventional, commerical, acrylic, core shell type, impact modifier Paraloid™ KM334 (Rohm and Haas Co.) 4 PHR is compared to example 3.1 at 7.5 PHR.

TABLE 7

Extrusion Test Formulations

| Ingredient-source | Part per hundred on PVC (PHR) | grams |
|---|---|---|
| PVC (Geon ™ 103) Polyone, Ohio | 100 | 2613 |
| Advastab ™ TM-181 Rohm and Haas, PA | 0.9 | 23.52 |
| Hostalub XL-165 Clariant, NC | 0.9 | 23.52 |
| Calcium Stearate | 1.4 | 36.58 |
| AC-629A Allied Signal, NJ | 0.1 | 2.61 |
| CaCO₃ (Omya UFT) Omya Inc, VT | 10 | 261.3 |
| TiO₂ (RCL-4) SCM Pigments, MD | 1 | 26.13 |
| Paraloid ™ K-120N Rohm and Haas, PA | 0.5 | 13.07 |
| Formulation 1 containing Example 3.1 | 7.5 | 195.98 |
| Comparative Formulation B containing Paraloid ™ KM334 Acrylic impact modifier | 4 | 104.5 |

TABLE 8

Extruder indications of melt viscosity

| Example | Extruder Melt Pressure | Percent Extruder Load |
|---|---|---|
| Test Formulation 1 | 18.08 MPa | 71 |
| Comparative Test Formulation B | 20.46 MPa | 76 |

Table 8 shows that the melt pressure and percent extruder load is lower for Formulation 1 than for Formulation 2, even though there is 7.5 PHR impact modifier in Formulation 1 compared to 4 PHR in Formulation 2. The results of Table 8 indicate that the comb copolymers of the present invention perform as processing aids as well as toughening agents, Impact Modifiers or Toughening Agents for Thermoplastics in General.

Just as the above materials were designed for PVC, analogs could be designed to function in a wide range of thermoplastics. The examples listed in Table 9 are expected to provide enhanced toughness to the listed types of thermoplastics.

TABLE 8

Thermoplastic polymers and comb copolymers that should toughen them

| Plastic | Example Comb Copolymer |
|---|---|
| poly(styrene-acrylonitrile) (SAN) | 3.1, 3.3, or 3.4 |
| poly(styrene-acrylonitrile-butadiene) (ABS) | 3.1, 3.3, or 3.4 |
| polyvinyl acetate | 3.1, 3.3, or 3.4 |
| polymethylmethacrylate (MMA) | 3.1, 3.3, or 3.4 |
| polymethylmethacrylate (MMA) | 3.1, 3.3, or 3.4 |
| chlorinated polyvinylchloride | 3.1, 3.3, or 3.4 |

TABLE 8-continued

Thermoplastic polymers and comb copolymers that should toughen them

| Plastic | Example Comb Copolymer |
|---|---|
| Polyamides, nylon etc. | 3.5 or 3.7 |
| Blends of ABS and nylon 6 | |
| Polyesters Polyethyleneterephthalate (PET) Polybutyleneterephthalate (PBT) | 3.5, 3.6, or 3.7 |
| Polycarbonate | 3.8 |
| Polyacetals | 3.5 |
| Polystyrene and vinyl aromatics | 3.8 |
| polyolefins | 3.9 |

The plastics additives may be admixed with various blends and alloys of one or more of the thermoplastic resins of Table 8. The utility of such blends is varied, but articles made from them include, for example, equipment panels and housings, such as for appliances or computers and automobile parts such as door panels and bumpers.

We claim:

1. A toughened article:
   wherein said toughened article comprises a thermoplastic polymer and a comb copolymer;
   wherein said comb copolymer comprises a backbone and at least one graft segment;
   wherein said comb copolymer is present in an amount sufficient that said article has an impact resistance energy increased at least 15 percent compared to a second article formed identically, absent said comb copolymer;
   wherein said comb copolymer is produced by a polymerization method comprising the steps of:
   (a) forming a macromonomer aqueous emulsion comprising a plurality of water-insoluble particles of macromonomer, wherein said macromonomer comprises polymerized units of at least one first ethylenically unsaturated monomer, said macromonomer further having:
      (i) a degree of polymerization of from 10 to 1000; and
      (ii) at least one terminal ethylenically unsaturated group;
   (b) forming a monomer composition comprising at least one second ethylenically unsaturated monomer; and
   (c) combining at least a portion of said macromonomer aqueous emulsion and at least a portion of said monomer composition to form a polymerization reaction mixture; and
   (d) polymerizing said macromonomer with said second ethylenically unsaturated monomer in the presence of an initiator to produce said plurality of comb copolymer particles; and
   wherein said macromonomer is produced by aqueous emulsion polymerization.

2. The article of claim 1 wherein said aqueous emulsion polymerization comprises polymerizing in an aqueous emulsion the at least first ethylenically unsaturated monomer in the presence of a transition metal chelate chain transfer agent and a free radical initiator to form said macromonomer particles.

3. The article of claim 1 wherein the first ethylenically unsaturated monomer is polymerized in the presence of a macromolecular organic compound having a hydrophobic cavity.

4. The article of claim 1, wherein said thermoplastic polymer is a polymer selected from the group consisting of poly(vinyl halide), ABS terpolymer, poly(styrene-acrylonitrile), poly(styrene-acrylonitrile-acrylate), polyaromatics, poly(vinyl acetate), poly(vinyl methyl ether), chlorinated polyethylene, phenoxy (polyhydroxypropylether of bisphenol A), poly(methyl methacrylate), poly(styrene-maleic anhydride), poly(ethylene-vinyl acetate), polyesters, polyamides, polyacetal, polyurethane, polyolefins, polycarbonate, and combinations thereof.

5. The article of claim 1, wherein said thermoplastic polymer is poly(vinyl chloride).

6. The article of claim 1, wherein said backbone is immiscible with said thermoplastic polymer.

7. The article of claim 1, wherein said graft segment is miscible with said thermoplastic polymer.

8. The article of claim 1, wherein said graft segment has a degree of polymerization of 10 to 1,000.

9. The article of claim 1, wherein said backbone has a glass transition temperature of −80° C. to 0° C.

10. The article of claim 1, wherein said graft segment has a glass transition temperature of 50° C. to 180° C.

11. The article of claim 1, wherein said graft segment and said backbone are in a weight ratio of 10:90 to 60:40.

12. The article of claim 1, wherein said comb copolymer has a weight average molecular weight of 50,000 to 2,000,000.

13. The article of claim 1, wherein said comb copolymer is present at 2 to 40 parts by weight per 100 parts by weight of said thermoplastic polymer.

14. A toughened article produced by a method comprising the steps of:
   (a) forming a solids blend comprising a thermoplastic polymer and a comb copolymer;
   (b) heating and mixing said solids blend to form a melt blend;
   (c) shaping said melt blend to form an article; and
   (d) cooling said article to room temperature;
   wherein said toughened article comprises a thermoplastic polymer and a comb copolymer;
   wherein said comb copolymer comprises a backbone and at least one graft segment;
   wherein said comb copolymer is present in an amount sufficient that said article has an impact resistance energy increased at least 15 percent compared to a second article formed identically, absent said comb copolymer;
   wherein said comb copolymer is produced by a polymerization method comprising the steps of:
     (a) forming a macromonomer aqueous emulsion comprising a plurality of water-insoluble particles of macromonomer, wherein said macromonomer comprises polymerized units of at least one first ethylenically unsaturated monomer, said macromonomer further having:
       (i) a degree of polymerization of from 10 to 1000; and
       (ii) at least one terminal ethylenically unsaturated group;
     (b) forming a monomer composition comprising at least one second ethylenically unsaturated monomer;
     (c) combining at least a portion of said macromonomer aqueous emulsion and at least a portion of said monomer composition to form a polymerization reaction mixture; and
     (d) polymerizing said macromonomer with said second ethylenically unsaturated monomer in the presence of an initiator to produce said plurality of comb copolymer particles; and
   wherein said macromonomer is produced by aqueous emulsion polymerization.

\* \* \* \* \*